United States Patent [19]

Grimmer

[11] 4,444,924

[45] Apr. 24, 1984

[54] HIGH STRENGTH CARBONATE CONTAINING RESIN COMPOSITION AND ITS METHOD OF MANUFACTURE

[75] Inventor: Rudolf Grimmer, Erlangen, Fed. Rep. of Germany

[73] Assignee: Siemens Aktiengesellschaft, Berlin and Munich, Fed. Rep. of Germany

[21] Appl. No.: 425,905

[22] Filed: Sep. 28, 1982

[30] Foreign Application Priority Data

Oct. 22, 1981 [DE] Fed. Rep. of Germany ....... 3141946

[51] Int. Cl.³ .................... C08L 63/04; C08L 63/02; C08L 63/00
[52] U.S. Cl. .................................. 523/445; 523/451; 523/453; 523/455; 523/457
[58] Field of Search ............... 523/440, 451, 453, 455, 523/457, 445

[56] References Cited

U.S. PATENT DOCUMENTS 2,841,504  7/1958  Liggett ................................ 523/200
3,314,912  4/1967  Bean et al. ......................... 523/451
3,468,839  9/1969  Millane .............................. 523/457

FOREIGN PATENT DOCUMENTS 666517    7/1963   Canada ............................... 523/200
51-46343  4/1976   Japan ................................. 523/457
56-88449  7/1981   Japan ................................. 523/200
1009198  11/1965   United Kingdom ................. 523/457

Primary Examiner—Lewis Y. Jacobs
Attorney, Agent, or Firm—Kenyon & Kenyon

[57] ABSTRACT

The invention relates to a filled, resin composition and a method for the manufacture therefor. The composition is a matrix of an epoxy resin, a carbonate-containing filler, particularly calcium-magnesium carbonate or calcium carbonate, an anhydride hardener and an adhesive at 0.1 to 3.0 percent by weight, relative to the weight of the filler. The adhesive is a multibasic organic acid, an organic hydroxy acid such as malic acid or an amino acid. In the process, the adhesive can first be added to the hardener or to the filler containing resin before hardener is added.

16 Claims, No Drawings

HIGH STRENGTH CARBONATE CONTAINING RESIN COMPOSITION AND ITS METHOD OF MANUFACTURE

BACKGROUND OF THE INVENTION

The invention relates to a method for the manufacture of a resin composition using an anhydride-hardened epoxy resin. The invention further relates to a resin composition containing carbonate filler and an adhesive which improves the mechanical strength of the hardened resin.

In order to extend epoxy resins and change their physical properties, they can be filled with milled calcium-magnesium carbonate or calcium carbonate. The mechanical properties such as strength, hardness, stiffness and dimensional integrity of the material molded from such a resin system, however, are about fifty percent lower than for systems filled with quartz particles. This decrease in mechanical strength properties is believed to be due to poor adhesion between the resin matrix and the carbonate filler.

SUMMARY OF THE INVENTION

It is an object of the invention, therefore, to improve the adhesion between the resin matrix and milled carbonate-containing fillers, so that the mechanical strength properties of the resulting hardened resin composition are improved. Another object is to develop an advantageous procedure for the manufacture of hardened epoxy resins filled with carbonate containing fillers.

Accordingly, the invention is directed to a resin composition and to a process for making the resin composition. The resin composition is a reacted mixture of epoxy resin interbonded with an anhydride hardener, a carbonate salt filler and a multibasic organic or inorganic acid adhesive present in an amount of about 0.1 to 3.0 percent by weight relative to the filler weight. The adhesive acts to improve the filled epoxy resin's mechanical properties such as strength, hardness, stiffness and dimensional integrity.

The process is reaction of the resin, hardener, filler and adhesive at a temperature of about 60° to about 150° C. until the resin is hardened or thermoset and wherein the adhesive is added to warmed resin before addition of or in mixture with the hardener.

DETAILED DESCRIPTION OF THE INVENTION

The resin composition of the invention has improved mechanical properties over similar carbonate salt filled epoxy resins which do not contain adhesive. It is believed this improvement is produced by reaction of the adhesive with the carbonate salt filler during preparation. The bonded adhesive in turn reacts with the epoxy resin so that in the produced composition, the hardened resin matrix is chemically bonded to the surfaces of the carbonate filler salt particles.

The combination of epoxy resin, anhydride hardener and carbonate filler salt is known in the art. The invention, as explained above includes an adhesive in thermohardened resin combinations such as these. The resulting composition, however, is chemically different since the adhesive acts as a chemical bonding link between the hardened resin matrix and the filler particles. Accordingly, the invention comprises known proportions of the epoxy resin, anhydride hardener and filler particle ingredients. The filler to resin proportions will be dependent upon the purposes for which the resulting composition is to be used. In general, the filler can be used in an extender capacity to extend the resin volume and lower production costs. Also, the filler can functionally interact with the resin matrix to affect dimensional stability, flexibility, hardness, heat deflection and transfer, and processability. The variations of resin to filler ratio needed to produce variations of these properties are known in the art.

Following the process of the invention, the resin is first warmed to produce a fluid medium, then filler is added. The slurry is mixed, then adhesive followed by hardener or a mixture of adhesive and hardener is added. The temperature is raised and the slurry stirred to obtain substantially uniform distribution of ingredients. Then it is poured into the heated molds where it hardens to form the desired product.

A preferred process is addition of the adhesive to the epoxy resin which has been filled with a carbonate salt preferrably a calcium-magnesium carbonate or a calcium carbonate, followed by reaction with the hardener to produce finished, i.e., hardened reaction resin composition. With this method, molded, hardened products of the finished composition can be obtained which have mechanical properties similar to those filled with quartz particles.

In the present invention, use of multibasic inorganic or organic acids will produce an increase in strength, hardness and stiffness of up to about twenty five percent. Even higher increases can be obtained when organic hydroxy or amino acids are used. For example, use of hydroxydi- and hydroxytricarboxylic acids as well as multibasic amino acids, will increase the mechanical properties of the composition up to about thirty percent.

Any multibasic inorganic or organic acid which will react with carbonate may be used in the invention. Suitable multibasic inorganic acids are, for example, phosphoric, sulfuric and boric acid. Suitable organic acids include maleic, succinic, fumaric, cyclohexanedicarboxylic and adipic acid.

Suitable organic hydroxy acids are, for example, hydroxybenzoic acid, or substituted forms thereof, 2-hydroxyethanesulfonic acid, tartaric, tartronic and glycolic acid, as well as particularly malic and citric acid.

Suitable multibasic amino acids are, for example, asparagine, glutamine, sulfanilic acid, aminobenzoic acid and taurine.

Any of the numerous anhydride hardeners include phthalic acid anhydride, tetrahydrophthalic acid anhydride and hexahydrophthalic acid anhydride.

In general, the epoxy resins used according to the invention will be a polymeric compound formed from an epoxide such as epichlorohydrin and another monomer having two reactive sites. These other monomers include hydantoins, phenol-formaldehyde products, diglycidyl esters and cycloaliphatic dicarboxylic acids. The epoxy resin includes polyepoxy compounds which contain more than one 1,2-epoxy group in the molecule and which can be reacted with the foregoing hardeners or hardener mixtures to form hard molding plastics. Such epoxy resins correspond to the general formula

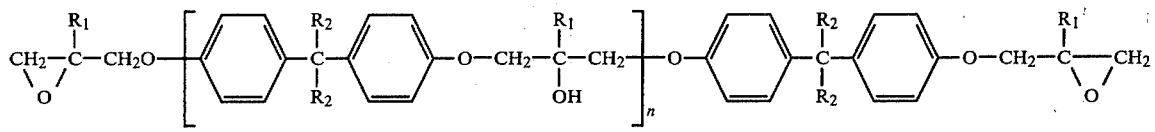

wherein the radical $R_1$ is H; $R_2$ is $CH_3$ or H; and n is a whole number of 0 to 20. As unfilled resins, these polyepoxy compounds have a viscosity at 25° C. of 10,000 to 15,000 mPas and an epoxy equivalent (EV) of 170 to 500. Such a resin can be made by known methods from bisphenol [di(4-hydroxyphenyl)methane or 2,2-di(4-hydroxyphenyl)propane] A and epichlorohydrin.

Further suitable resins include epoxy-hydantoin resins, epoxy-phenol-formaldehyde resins such as novolak, epoxy diglycidyl ester resins and epoxy cycloaliphatic dicarboxylic acid resins.

Finely milled calcium carbonate or calcium-magnesium carbonate can be used as a filler. Particularly preferred as fillers are milled dolomite and calcite.

The resin composition according to the invention may be used as an immersion resin, a casting resin, or an embedment and insulating material especially for electrotechnology. They are used to particular advantage for the manufacture of parts for $SF_6$ technology.

The invention is further illustrated by the following examples.

EXAMPLE 1

Epoxyphenol-Dolomite-Phthalic anhydride-Malic acid Composition 1000 g of a bisphenol-A epoxy resin (EP number: 0.24) was heated to 140° C. and added thereto was 2500 g finely milled dolomite which had previously been dried at 140° C. and 1 mbar for 2 hours. Then 12.5 g malic acid was added with stirring at 140° C. This mixture was outgassed at 1 mbar at 140° C. for 2 hours. Subsequently, 320 g phthalic acid anhydride heated to 140° C. was added as a hardener. This hardening containing mixture was outgassed at 1 mbar at 140° C. for five minutes and was then poured into the molds preheated to 150° C. Hardening occurred at 150° C. over a period of sixteen hours.

The standard rods (120 mm × 15 mm × 10 mm) made in this manner were tested for dimensional stability after Martens, bending strength and impact strength after they were stored one week at room temperature. Tests were also conducted on a hardened filled resin of the same ingredients but without malic acid and which was prepared in the same manner. The comparative results are below.

|  | Dimensional Stability after Martens °C. | Bending Strength N/mm² | Impact Strength kJ/m² |
| --- | --- | --- | --- |
| Filled resin without addition of malic acid | 13 | 78 | 6.9 |
| Composition with addition of malic acid | 110 | 90 | 9.2 |

EXAMPLE 2

Epoxyphenol-Dolomite-Phthalic anhydride-Fumaric acid Composition 1000 g of a bisphenol-A epoxy resin (EP number 0.24) was heated to 140° C. and added thereto was 2500 g of finely milled dolomite which had previously been dried at 1 mbar and 140° C. for two hours. This mixture was outgassed at 1 mbar at 140° C. for thirty minutes. Subsequently, 320 g phthalic acid anhydride in which 12.5 g fumaric acid was dissolved at 160° C., was added to this mixture as a hardener/adhesive combination. This hardener containing mixture was outgassed at 1 mbar at 140° C. for five minutes and was then poured into molds preheated to 150° C. Hardening occurred at 150° C. over a period of about sixteen hours.

Tests were conducted on comparative standard rods as desired in Example 1. The results are below.

|  | Dimensional Stability after Martens °C. | Bending Strength N/mm² | Impact Strength kJ/m² |
| --- | --- | --- | --- |
| Filled resin without addition of fumaric acid | 113 | 78 | 6.9 |
| Composition with addition of fumaric acid | 115 | 91 | 8.3 |

EXAMPLE 3

Epoxyhydantoin-Phthalic acid anhydride-Dolomite-Citric acid Composition 400 g of a hydantoin epoxy resin was mixed with 44 g of a phthalic acid anhydride at 80° C. Then was added while stirring, 1520 g finely milled dolomite which had previously been dried for two hours at 120° C. Into this slurry, heated to 80° C., was stirred 7.6 g citric acid. The resulting mixture was outgassed at 2 mbar at 80° C. for ten minutes and then poured into molds preheated to 160° C. Hardening occurred at 160° C. over a period of about four hours. Tests were conducted on comparative standard rods as described in Example 1. The results are below.

|  | Dimensional Stability after Martens °C. | Bending Strength N/mm² | Impact Strength kJ/m² |
| --- | --- | --- | --- |
| Filled resin without addition of citric acid | 126 | 61 | 5.2 |
| Composition with addition of citric acid | 143 | 81 | 5.7 |

EXAMPLE 4

Glycidyl Ester-Calcite-Hexahydrophthalic anhydride-Phosphoric acid Composition 1000 g hexahydrophthalic acid diglycidyl ester was mixed at 180° C. with 3800 g finely milled calcite. This slurry was outgassed at 1 mbar at 80° C. for thirty minutes. Subsequently, 900 g hexahydrophthalic acid in which 15 g phosphoric acid was dissolved, was added. After outgassing the resulting mixture for five minutes, 10 g of a tertiary amine was mixed-in as an accelerator and the composition was poured into the molds preheated to 80° C. Hardening occurred over a period of about six hours at 80° C. and ten hours at 140° C. Tests were conducted on comparative standard rods as described in Example 1. The results are below.

|  | Dimensional Stability after Martens °C. | Bending Strength N/mm$^2$ | Impact Strength kJ/m$^2$ |
| --- | --- | --- | --- |
| Filled resin without addition of phosphoric acid | 108 | 67 | 6.7 |
| Composition with addition of phosphoric acid | 103 | 77 | 7.3 |

What is claimed is:

1. A filled resin composition comprising an epoxy resin interbonded with an anhydride hardener, a multibasic hydroxyorganic, organic or inorganic acid adhesive, and a carbonate salt filler wherein the hardened resin and the filler are interbonded by the adhesive and the adhesive is present in an amount of about 0.1 to 3 percent by weight relative to the filler weight.

2. A composition according to claim 1 wherein the epoxy resin is a bisphenol methane epoxy resin, an epoxy hydantoin resin, an epoxy formaldehyde resin, a phenol-formaldehyde epoxy resin, an epoxy glycidyl ester resin or a cycloaliphatic dicarboxylic acid epoxy resin.

3. A composition according to claim 1 wherein the anhydride hardener is phthalic anhydride, tetrahydrophthalic anhydride, hexahydrophthalic anhydride or diglycidic anhydride.

4. A composition according to claim 1 wherein the filler is calcium or magnesium carbonate.

5. A composition according to claim 1 wherein the filler is dolomite or calcite.

6. A composition according to claim 1, 2, 3, 4 or 5 wherein the adhesive is a multibasic organic acid.

7. A composition according to claim 1, 2, 3, 4 or 5 wherein the adhesive is a multibasic inorganic acid.

8. A composition according to claim 1, 2, 3, 4 or 5 wherein the adhesive is a multibasic hydroxy organic acid.

9. A composition according to claim 1, 2, 3, 4 or 5 wherein the adhesive is malic acid, citric acid, tartaric acid, tartronic acid, succinic acid, fumaric acid, glutamine, asparagine or adipic acid.

10. A process for the preparation of a composition according to claim 1, which comprises:

heating the epoxy resin to a temperature where it is fluid;

mixing the filler with the resin to form a substantially dispersed slurry of filler in the resin;

adding warmed adhesive followed by adding warmed anhydride hardener to the slurry, or adding a warmed solution of adhesive and anhydride hardener to the slurry, to form a reactive mixture, the adhesive and hardener or solution being warmed to about the same temperature as the slurry, and the adhesive being about 0.1 to 3 percent by weight of the weight of the filler; and heating the reactive mixture at a temperature of from about 60° C. to about 150° C. until it has set.

11. A process according to claim 10 comprising adding the solution of adhesive and hardener to the slurry.

12. A process according to claim 10 comprising adding sequentially the adhesive and then the hardener to the slurry.

13. A process according to claim 10, 11 or 12 comprising allowing the reactive mixture to thermoset in a molded form.

14. A process according to claim 10 wherein the resin is an epoxy resin, an epoxy-hydantoin resin, an epoxy-formaldehyde resin or an epoxy-glycidyl ester resin.

15. A process according to claim 10 wherein the adhesive is a multibasic organic or inorganic acid.

16. A process according to claim 10 wherein the adhesive is malic acid, citric acid, adipic acid, tartaric acid, tartronic acid, succinic acid, fumaric acid, glutamine or asparagine.

* * * * *